H. W. Caswell.

Upsetting Tires.

N° 57,475.  Patented Aug. 28, 1866.

Witnesses:
Jas. A. Service
J. M. Covington

Inventor:
H. W. Caswell
Per Munn & Co
Attorneys

UNITED STATES PATENT OFFICE.

H. W. CASWELL, OF YARMOUTH, MAINE.

IMPROVED DEVICE FOR SHRINKING TIRE.

Specification forming part of Letters Patent No. 57,475, dated August 28, 1866.

*To all whom it may concern:*

Be it known that I, H. W. CASWELL, of Yarmouth, Cumberland county, State of Maine, have invented a new and Improved Device for Shrinking Tires; and I do hereby declare that the following is a full, clear, and exact description thereof, which will enable others skilled in the art to make and use the same, reference being had to the accompanying drawings, forming part of this specification, in which—

Figure 1:
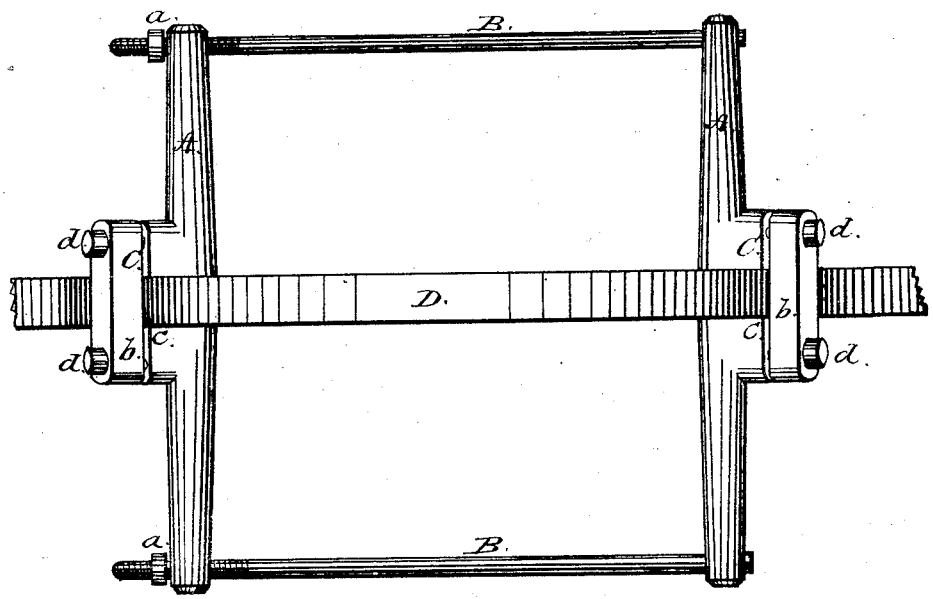
Figure 2:
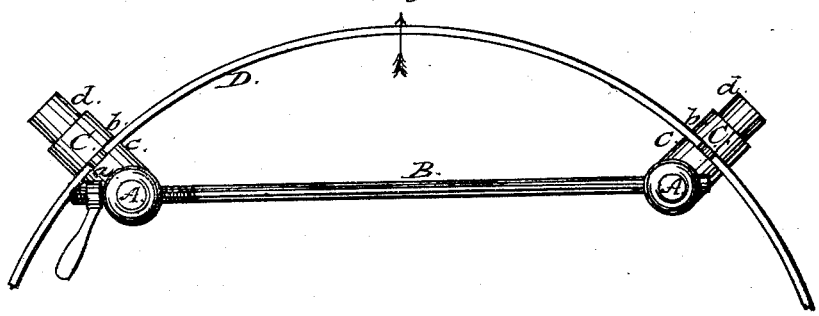

Figure 1 is a plan or top view of my invention; Fig. 2, a side view of the same.

Similar letters of reference indicate like parts.

This invention relates to a new and simple device for shrinking tires for wheels, so as to avoid the cutting and rewelding of the same. Tires frequently require to be contracted, owing to the shrinking of the wheels, and it is rather a difficult matter to do the work nicely by cutting and rewelding, and the tires are often contracted too much, and the spokes of the wheel bent thereby, and the wheel materially injured.

Various tire-shrinking devices have been devised, but they are generally complicated, cumbersome to handle, and consequently are not in very general use.

A A' represent two parallel metal bars, which are connected together by the rods B B near their ends, said rods having screw-threads cut on one end to receive nuts $a$ $a$, by turning which the bars A A' may be adjusted nearer together or farther apart, as may be desired, the bar A being allowed to slide freely on the rods B B. Each bar A is provided with a clamp, C, composed of a short bar, $b$, fitted over projections $c$ on the bars, screws $d$ passing through the bars $b$ into the projections $c$. (See Fig. 1.)

This device is applied to the tire D when the latter is cold, the tire being fitted in the clamp C, and firmly secured therein by screwing up the screws $d$. The portion of the tire between the clamps C is then heated and the bars A A' are brought a little closer together by screwing up the nuts $a$ $a$, and then, by striking the outer or convex surface of the heated part of the tire it will be upset or contracted.

By screwing up the nuts $a$ $a$, after the tire is heated between the bars A A', the heated portion will be slightly bent outward in the direction indicated by the arrow, Fig. 2, and then, by striking on the outer side of said bent heated portion, the latter, of course, must be upset or contracted, as the heated portion is prevented by the clamps C from straightening out under the effect of the blow.

Having thus described my invention, what I claim as new, and desire to secure by Letters Patent, is—

The two parallel bars A A', connected by the screw-rods B B, and provided with the clamps C C, all constructed and arranged to operate in the manner substantially as and for the purpose herein set forth.

H. W. CASWELL.

Witnesses:
 E. H. WALKER,
 JOEL BROOKS.